(12) United States Patent
Kenyon et al.

(10) Patent No.: US 6,423,437 B1
(45) Date of Patent: Jul. 23, 2002

(54) PASSIVE AIR BREATHING FUEL CELLS

(75) Inventors: Kenneth H. Kenyon, Verona; Matthew M. Doeppers, Madison; Samir E. Ibrahim, Verona, all of WI (US)

(73) Assignee: Enable Fuel Cell Corporation, Middleton, WI (US)

( * ) Notice: Subject to any disclaimer, the term of this patent is extended or adjusted under 35 U.S.C. 154(b) by 35 days.

(21) Appl. No.: 09/765,116

(22) Filed: Jan. 19, 2001

(51) Int. Cl.[7] .................................................. H01M 8/04
(52) U.S. Cl. ........................................... 429/32; 429/39
(58) Field of Search ................................. 429/12, 30–32, 429/34, 37–39

(56) References Cited

U.S. PATENT DOCUMENTS

| | | |
|---|---|---|
| 4,310,605 A | 1/1982 | Early et al. |
| 4,444,851 A | 4/1984 | Maru |
| 4,826,742 A * | 5/1989 | Reiser ........................... 429/26 |
| 5,230,966 A | 7/1993 | Voss et al. |
| 5,486,430 A | 1/1996 | Gorbell et al. |
| 5,514,486 A | 5/1996 | Wilson |
| 5,543,240 A | 8/1996 | Lee et al. |
| 5,595,834 A | 1/1997 | Wilson et al. |
| 5,935,725 A * | 8/1999 | Dhar et al. .................... 429/12 |
| 6,322,918 B1 * | 11/2001 | Kelley et al. ................. 429/17 |

OTHER PUBLICATIONS

Larminie and Dicks, *Fuel Cell Systems Explained* (book), John Wiley & Sons, 2000, pp. 101 and 103., No month.

* cited by examiner

*Primary Examiner*—Patrick Ryan
*Assistant Examiner*—Susy Tsang-Foster
(74) *Attorney, Agent, or Firm*—Foley & Lardner

(57) ABSTRACT

A polymer electrolyte fuel cell includes fuel cell units arranged along a common axis in a stack with an inner periphery of the fuel cell units defining a fuel flow channel through which the fuel can flow in an axial direction. Current collectors are electrically connected to the fuel cell units at the top and bottom of the stack. One or more diffusion cell units are stacked below the lower current collector and have an inner periphery defining a continuation of the fuel flow channel. The fuel inlet allows the introduction of hydrogen fuel to the top end of the flow channel while the bottom end of the flow channel below the diffusion cell units is blocked. Water vapor and inert gases collecting at the bottom end of the fuel flow channel diffuse out through the diffusion cell units to maintain the electrical generating efficiency of the active fuel cell units. Diffusion cell units may be mounted in the middle of the stack where fuel is fed in from both ends of the stack.

37 Claims, 5 Drawing Sheets

PASSIVE AIR BREATHING FUEL CELLS

FIELD OF THE INVENTION

This invention pertains generally to fuel cells and particularly to passive air breathing polymer electrolyte fuel cells.

BACKGROUND OF THE INVENTION

Polymer electrolyte fuel cells (also known as proton exchange membrane fuel cells) are well suited to low power applications of the type now typically served by conventional batteries. Such fuel cells are usually designed to use hydrogen gas as the fuel and may be designed to operate with ambient air as the oxidant. Larger fuel cells are often actively humidified, cooled, or supplied with fuel or oxygen under pressure. However, for fuel cells intended to be used as portable power sources, it is highly desirable that the operation of the fuel cell be passive, with no requirement for forcing either hydrogen fuel or air through the fuel cell.

A suitable passive fuel cell which meets the requirements for a portable power supply is shown and described in U.S. Pat. No. 5,514,486 to Wilson and U.S. Pat. No. 5,595,834 to Wilson, et al. The fuel cells shown in these patents are formed of a stack of unit cells, distributed along a common axis. The fuel cell components include a polymer electrolyte membrane, an anode and a cathode contacting opposite sides of the membrane, and fuel and oxygen flow fields contacting the anode and cathode, respectively, with the components defining an annular region therethrough along the axis that acts as a fuel flow channel. A fuel distribution manifold is mounted within the annular region to distribute fuel to the flow field in each of the unit cells. A single bolt through the annular region clamps the unit cells together. During operation of fuel cells of this type, the fuel cell consumes hydrogen supplied from a fuel source and oxygen supplied from the ambient air, produces electricity and water. In a completely passive fuel cell of this type, there are no pumps to recirculate or remove the reactants or the reaction products. The hydrogen fuel is introduced into the hydrogen supply flow channel of the fuel cell through an inlet, but there is no outlet for the water vapor and other inert gases which accumulate within the fuel cell except through the active membranes of the cell units. Water vapor and inert gas tend to accumulate at the closed end of the hydrogen flow channel (or in the middle of the channel where hydrogen gas is fed in from both ends), with the result that the hydrogen gas is diluted in the region of the closed end (or middle) of the fuel cell and the voltages produced by the unit cells near the closed end (or middle) are consequently reduced. The inert gases most commonly include nitrogen, which can diffuse into the fuel cell through the polymer electrolyte membrane, and possibly also other impurity gases which are fed into the fuel cell with the hydrogen fuel gas.

A conventional method of removing the accumulated inert gases and water vapors from a passive fuel cell is to provide a manually operated purge valve at the closed end of the hydrogen supply channel, with the valve periodically being opened to release the inert gases and vapors. See, e.g., Larminie and Dicks, *Fuel Cell Systems Explained* (book), John Wiley & Sons, 2000, p. 101. The provision of a valve to be manually operated to allow purge of the fuel gases means that proper operation of the fuel cell is dependent on human intervention. If the opening of the valve to purge the system is not carried out often enough, the efficiency of the fuel cell will degrade, whereas if the system is purged too often an unnecessary volume of fuel gas will be released. The opening of the purge valve can be automated, or the hydrogen gas can be circulated using a pump, but doing so compromises the desired passive nature of the fuel cell.

SUMMARY OF THE INVENTION

In accordance with the invention, an improved passive fuel cell effectively purges water vapor and inert gases from the closed end of the fuel flow channel within the fuel cell or from the middle of the channel in a fuel cell that is fed from both ends. The purging is carried out entirely passively, without the need for moving parts, manual intervention, hydrogen circulation, or electrical control circuits. Because no active components are required, none of the electrical power output of the fuel cell need be diverted to supply power to pumps and/or controls.

The polymer electrolyte fuel cell of the present invention includes a plurality of fuel cell units arranged along a common central axis in a stack. The fuel cell units may be formed in a conventional manner, and each includes a polymer electrolyte membrane. The stacked fuel cell units have an inner periphery defining a fuel flow channel through which fuel can flow in an axial direction. An electrically conductive current collector is electrically connected to an anode of a fuel cell unit at one end of the stack and an electrically conductive current collector is electrically connected to the cathode of a fuel cell unit at another end of the stack. A fuel supply inlet is positioned at one end of the stack to direct fuel therethrough to the flow channel. At least one diffusion cell unit is mounted at the end of the stack of fuel cell units opposite to that at which the fuel inlet is mounted and at a position below and electrically insulated from the current collector at that end of the stack. The diffusion cell unit comprises at least a layer of diffuser material, and has an outer periphery exposed to the ambient atmosphere and an inner periphery that defines a continuation of the flow channel. The diffusion cell unit is formed to diffuse chiefly water vapor from the flow channel outwardly therethrough from the inner periphery to the outer periphery of the layer of diffuser material. The flow channel is closed at the end thereof that is adjacent to the diffusion cell unit. As the fuel cell operates, water vapor collects at the closed end of the flow channel at which the diffusion cell unit is located. The water vapor diffuses outwardly through the diffusion cell unit and is thereby purged from the flow channel. A plurality of diffusion cell units may be stacked together, as appropriate, to increase the rate of diffusion of the water vapor out of the fuel cell. The active fuel cell units are spaced away from the closed end of the fuel flow channel at which water vapor accumulates, and thus are exposed to significantly less water vapor than are the end cells in a conventional fuel cell stack; as a result, the overall output voltage provided from the fuel cell between the current collectors does not substantially degrade over time. For a fuel cell fed from both ends, the diffusion cell units are mounted in the middle of the stack, with an electrically conductive bridge conducting current from the active fuel cells around the diffusion cell units. Because the diffusion cell units do not contribute to the output voltage of the fuel cell, the water vapor diffusing through the diffusion cell units does not affect the operating characteristics of the fuel cell.

The diffusion cell units may be formed of a water vapor permeable membrane, such as nylon, between layers of diffuser material. A first layer of diffuser material has an inner periphery which is in communication with the flow channel and is sealed at its outer periphery from the ambient atmosphere, and a second layer of diffuser material, on the opposite side of the membrane from the first layer, has an inner periphery sealed from the fuel flow channel and an outer periphery exposed to the ambient atmosphere. Water vapor from the flow channel thus diffuses through the first diffuser layer, then through the vapor permeable membrane to the second layer of diffuser material, and thence through the second layer of diffuser material to the ambient atmosphere. The vapor permeable membrane may be formed as a polymer electrolyte membrane so that any hydrogen gas diffusing outwardly from the flow channel and oxygen in the air diffusing inwardly are combined at the membrane to produce water, thereby reducing the amount of hydrogen gas that is released by the fuel cell to the atmosphere. For such purposes, the catalyst may be formed on the side of the membrane in communication with the air, or the membrane may be catalyzed on both sides in the same manner as the normal fuel cell membrane. The membrane may also be formed of non-catalyzed materials, such as nylon film, that have the ability to pass moisture therethrough while inhibiting the flow of hydrogen and air gases therethrough.

Further objects, features, and advantages of the invention will be apparent from the following detailed description when taken in conjunction with the accompanying drawings.

DETAILED DESCRIPTION OF THE INVENTION

Figure 1:
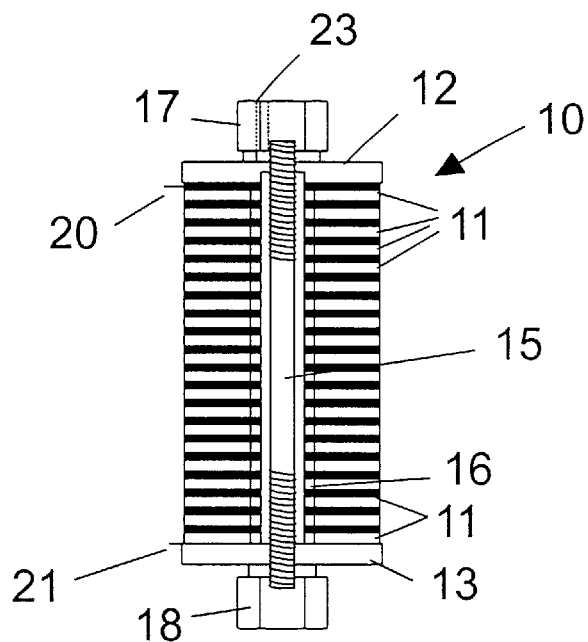
FIG. 1 is a somewhat simplified cross-sectional view of a conventional annular feed air breathing fuel cell stack in accordance with the prior art.

For exemplification, the present invention may be utilized with the type of passive air breathing fuel cell shown in the aforesaid U.S. Pat. Nos. 5,514,486 and 5,595,834, the disclosures of which are incorporated herein by reference, although it is understood that the invention may be utilized with other types of polymer electrolyte fuel cell structures employing stacks of fuel cell units. A simplified view of the type of fuel cell described in the aforesaid patents is shown in cross section generally at 10 in FIG. 1. This type of passive fuel cell has a stack of fuel cell units 11 which are held together in the stack by end plates 12 and 13. A bolt 15 extends through a central fuel supply channel 16, and nuts 17 and 18 are threaded onto the ends of the bolt 15 into engagement with the end plates 12 and 13, respectively, to press on the end plates, thereby compressing the stack of fuel cell units 11 and holding the stack together. An upper current collector plate 20 is mounted in the stack between the end plate 12 and the uppermost fuel cell unit 11 in the stack, and a bottom current collector plate 21 is mounted between the bottom end plate 13 and the lowest fuel cell unit 11 in the stack. Reference to the plate 20 as the upper plate and to the plate 21 as the bottom plate (and other references herein to top and bottom, etc.) are for convenience only. It is understood that the fuel cells may be in other orientations, and are typically operated lying horizontally. The current collectors are typically insulated from the end plates. As the fuel cell 10 operates, a voltage is generated between the current collector plates 20 and 21, from which the output power of the fuel cell is taken. The top nut 17 has an inlet opening 23 therein which extends to communication with the flow channel 16 through which hydrogen gas is introduced into the flow channel from a source (not shown) such as a tank. A protective shell (not shown), with openings to allow gasses to flow freely, may be mounted around the stack of fuel cell units to protect them from physical damage. Although not shown in FIG. 1, a fuel distribution manifold of the type described in the aforesaid patents U.S. Pat. Nos. 5,514,486 and 5,595,834 may be mounted within the fuel flow channel 16. The bottom end of the flow channel 16—the end opposite to the end at which the fuel supply inlet 23 is formed—is closed off by the bottom plate 13 and the nut 18 so that no hydrogen gas can escape from the flow channel 16 at the bottom end. As the fuel cell operates, water vapor accumulates at a position adjacent to the bottom end of the channel 16 near the bottom end plate 13.

When a fuel cell having the configuration of FIG. 1 is operated, the hydrogen gas travels through the central channel of the stack end to the closed end, diffusing radially into the various cells. These cells consume hydrogen to make electricity and produce water as a by-product. Some of this water diffuses back into the central flow channel and then gets carried along with the flow of hydrogen to the closed end of the stack. This water slowly diffuses out through the lowermost cells into the atmosphere. As the load (current per cell area) is increased, the rate of water production by the cells exceeds the rate at which it can diffuse out of the cells. The cells whose internal diameters get coated with a film of water now do not have access to the hydrogen gas and tend to drop in performance. This is commonly referred to as "flooding." Flooding will occur at any point in the central channel where there is stagnation of the supply of hydrogen. Where hydrogen is fed in from one end only of the stack, the flooding tends to occur at the bottom or closed end of the flow channel. If the hydrogen is fed in from both ends of the stack (e.g., through hydrogen end feeds in both of the nuts 17 and 18), the flooding would occur at cell units approximately in the middle of the stack.

The conventional solution to this problem has been to provide a manually operated valve mounted at the bottom end plate 13 or at the bottom nut 18 which can be periodically opened to discharge accumulated water vapor and inert gas. As noted above, the use of a valve has the significant disadvantage that it relies on the user of the fuel cell to operate the valve at appropriate times.

Figure 2:
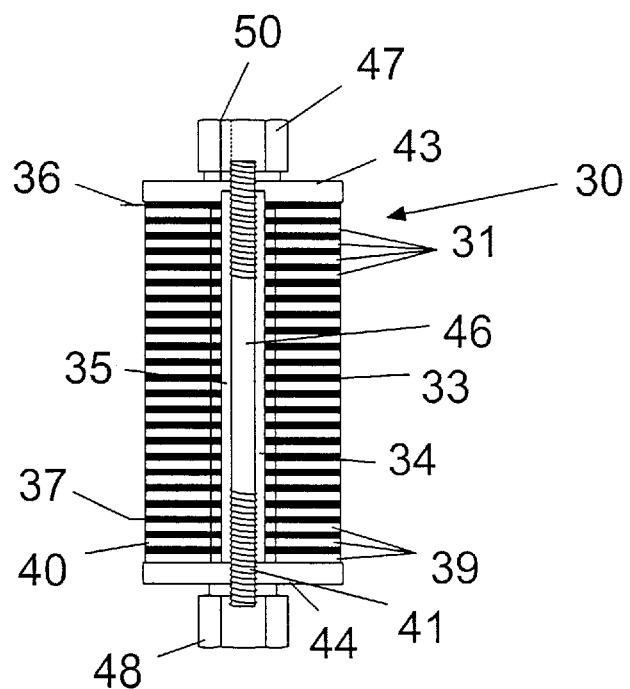
FIG. 2 is a simplified cross-sectional view of a passive air breathing fuel cell in accordance with the present invention.

In accordance with the present invention, a passive air breathing fuel cell 30 is shown generally in a simplified cross-sectional view in FIG. 2. The fuel cell 30 of the invention may be constructed in a manner similar to that of the stacked fuel cell 10 of FIG. 1, having a plurality of fuel cell units 31 mounted together in stacked relation, with each of the fuel cell units 31 having an (preferably circular) outer periphery 33 and an (preferably circular) inner periphery 34 which defines a fuel flow channel 35. An upper current collector plate 36 is electrically connected to the uppermost one of the fuel cell units 31, and a lower current collector plate 37 is electrically connected to the lowermost of the fuel cell units 31. In accordance with the invention, at least one and preferably a plurality of diffusion cell units 39 are mounted below the lower current collector plate 37. The diffusion cell units have an (preferably circular) outer periphery 40 and an (preferably circular) inner periphery 41 which defines a continuation of the fuel flow channel 35. An upper end plate 43 is engaged against the upper current collector plate 36 (preferably with a layer of electrical insulation between the end plate and the current collector), and a lower end plate 44 is engaged against the lowest diffusion cell unit 39 (preferably separated by a layer of insulation). The fuel cell units 31 and diffusion cell units 39 are preferably annular in shape and symmetrical about a common axis. A bolt 46 extends through the flow channel 35 and through the upper end plate 43 and lower end plate 44, and an upper nut 47 and a lower nut 48 are threadingly engaged to the bolt 46 to press against the end plates 43 and 44, respectively, to compress the stacked fuel cell units 31 and diffusion cell units 39 together. A fuel supply inlet 50 is formed in the top nut 47 and extends to the top end of the fuel flow channel 35 to direct hydrogen fuel therethrough to the fuel flow channel 35. The bottom end of the fuel flow channel 35 is closed and sealed by the nut 48. As the fuel cell 30 is operated, water vapor and inert gases tend to accumulate at the bottom end of the flow channel 35 near the bottom end plate 44. This water vapor, and any inert gases so accumulated, diffuses outwardly through the diffusion cells 39. The diffusion cells 39 do not generate electricity. The bottom-most active fuel cells units 31 are spaced away from the bottom end of the flow channel 35 by virtue of the intervening diffusion cell units 39, and thus the hydrogen gas in the flow channel 35 reaches these fuel cell units substantially undiluted, so that even the lowest fuel cell units adjacent to or near the bottom current collector plate 37 will operate at essentially the same efficiency as all of the other fuel cell units 31.

Figure 3:
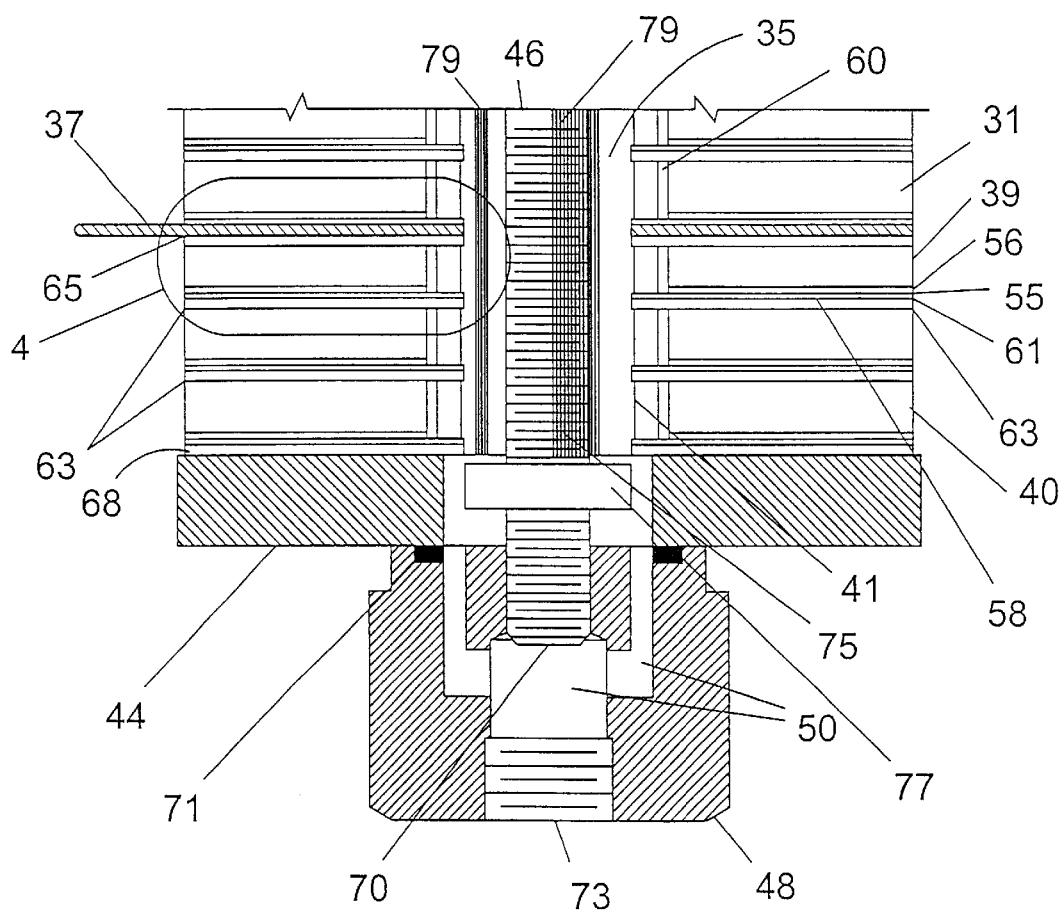
FIG. 3 is a more detailed cross-sectional view of the lower end of the fuel cell of FIG. 2.

A more detailed view of the bottom region of the fuel cell is shown in FIG. 3. As illustrated therein, and in the more detailed view of FIG. 4 and the exploded view of FIG. 5, each of the diffusion cell units 39 includes a moisture permeable membrane 55, a first upper layer of diffuser material 56, a second upper layer of diffuser material 57 above the layer 56, and a lower layer of diffuser material 58 on the side of the membrane 55 opposite to the side at which the diffuser material layers 56 and 57 are located. The use of a thin layer 56 and a thick layer 57 of diffuser material is shown, but it is understood that a single layer (or three or more layers) may be utilized. Similarly, the diffuser layer 58 may be a single layer or multiple layers. An inner ring gasket 60 engages with the membrane 55 to seal off the inner periphery of the diffusion cell unit from the flow channel 35 except at the exposed inner periphery of the lower diffuser layer 58. A ring shaped outer gasket 61 is engaged with the membrane 55 at the outer periphery of the diffusion cell unit and seals off the bottom diffuser layer 58 from the outside air. A gas impermeable (e.g., a metal) cell divider 63 is mounted between adjacent cell units and engaged with the top diffuser layers 57 and 58 to separate the cell units and prevent flow therebetween. At the topmost cell unit 39, an electrical insulator plate 65 may be mounted, if desired, to insulate the top diffusion cell unit from the lower current collector plate 37. Water vapor and inert gases accumulating at the bottom end of the flow channel 35 below the lower current collector plate 37 seep into the lower diffuser layer 58 and diffuse through the layer into contact with the moisture permeable film 55. The moisture passes through this film into the upper diffuser layer 56 and thence to the second or thicker upper diffuser layer 57, and diffuses outwardly to the outer periphery 40 of the diffusion cell where it is released to the atmosphere.

The moisture permeable film 55 may be formed of any of various materials which allow moisture to pass therethrough but preferably inhibit the flow of other gases. An example of a suitable moisture permeable film is nylon film. The material of the diffuser layers 56, 57, and 58 may be formed of any material that readily diffuses water vapor therethrough. If it is desired to reduce the amount of hydrogen gas that passes through the diffusion cell units to the outside atmosphere, the diffusion cell units 39 can be formed in a manner similar to the fuel cell units 31 so as to consume the hydrogen that enters the diffusion cell units. In that case, the moisture permeable membrane 55 may be formed as a polymer electrolyte membrane of the type described in the aforesaid patents U.S. Pat. Nos. 5,514,486 and 5,595,834, e.g., a polymer electrolyte membrane catalyzed with a thin film platinum catalyst layer (e.g., about 0.15 mg Pt/cm$^2$/electrode, as described patents U.S. Pat. Nos. 5,211,984 and 5,234,777) sandwiched between uncatalyzed ELAT backings (E-Tek, Inc., Natwick, Mass.) as the diffuser layers 56 and 58. The material of the diffuser layer 58 may also be formed as in a fuel cell unit, e.g., of macroporous electrically conductive material such as carbon fiber based paper available under the name Spectracarb 2050 available from Spectracorp, Inc., Lawrence, Mass. For non-catalyzed membranes, other suitable materials such as metal/ceramic foams and various fabrics may be utilized. When utilizing an active polymer electrolyte membrane to consume hydrogen gas diffusing outwardly, diffusion cell units 39 so constructed will develop a voltage across each cell unit. However, because these diffusion cell units 39 are separated from the fuel cell units 31, no current flows through them and they do not affect the overall voltage developed between the current collectors 36 and 37. The diffusion cell units 39 may be electrically insulated from the end plate 44 by an electrical insulator disk 68. The active fuel cell units 31 may be constructed in a manner identical to that described above for the diffusion cell units 39 and as described in the aforesaid patents U.S. Pat. Nos. 5,514,486 and 5,595,834. It is understood that the stack of fuel cell units may have any desired construction for polymer electrolyte membrane fuel cells having stacked fuel cell elements, and the diffusion cell units 39 may be formed without an active polymer electrolyte membrane, or with an active catalyst on one side only, while still providing effective diffusion of water vapor out of the fuel cell to increase the efficiency of the active fuel cell units in the stack.

As also shown in the more detailed view of FIG. 3, the bottom nut 48 is threaded onto the threaded bottom end 70 of the bolt 46 into engagement with the end plate 44, with an O-ring 71 seated in a groove in the nut 48 to provide an airtight seal between the end plate 44 and the nut 48. For purposes of illustration, the nut 48 is shown as having fuel supply inlet channels 50 formed therein, with the nut 48 and the nut 47 having the same interior construction. As illustrated in FIG. 3, the nut 48 has an open central section of the fuel inlet channels 50, centered in the middle of the nut, that is closed by a plug 73 which screws into the open end of the nut 48 to close off the inlet channels 50 and thereby close off the bottom end of the fuel distribution channel 35. If desired, a conventional purge valve (not shown) may be connected to the channels 50 in the nut 48 to allow selected purge of the central channel (for example, to allow a purge before initial start-up). A hydrogen supply line may be connected to the corresponding central open section of the inlet of the nut 47. The fuel cell stack may be held in compression using mechanical means other than the threaded center bolt 46. An example is a conventional clamp external to the cell units or threaded bolts, etc., which are capable of holding the cell units together.

Figure 4:
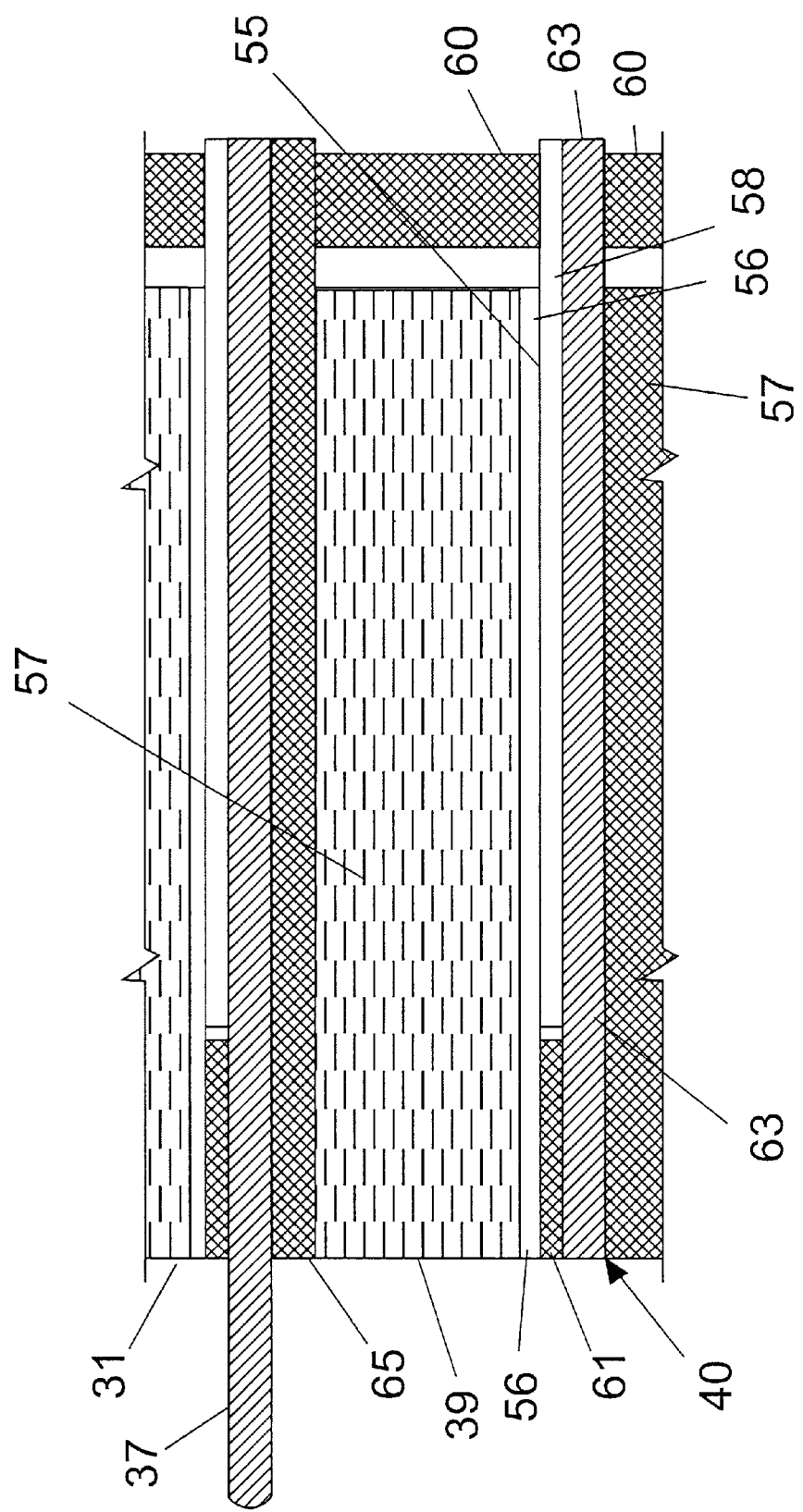
FIG. 4 is a detailed cross-sectional view of the layers forming a diffusion cell unit in the fuel cell of FIG. 2.
Figure 5:
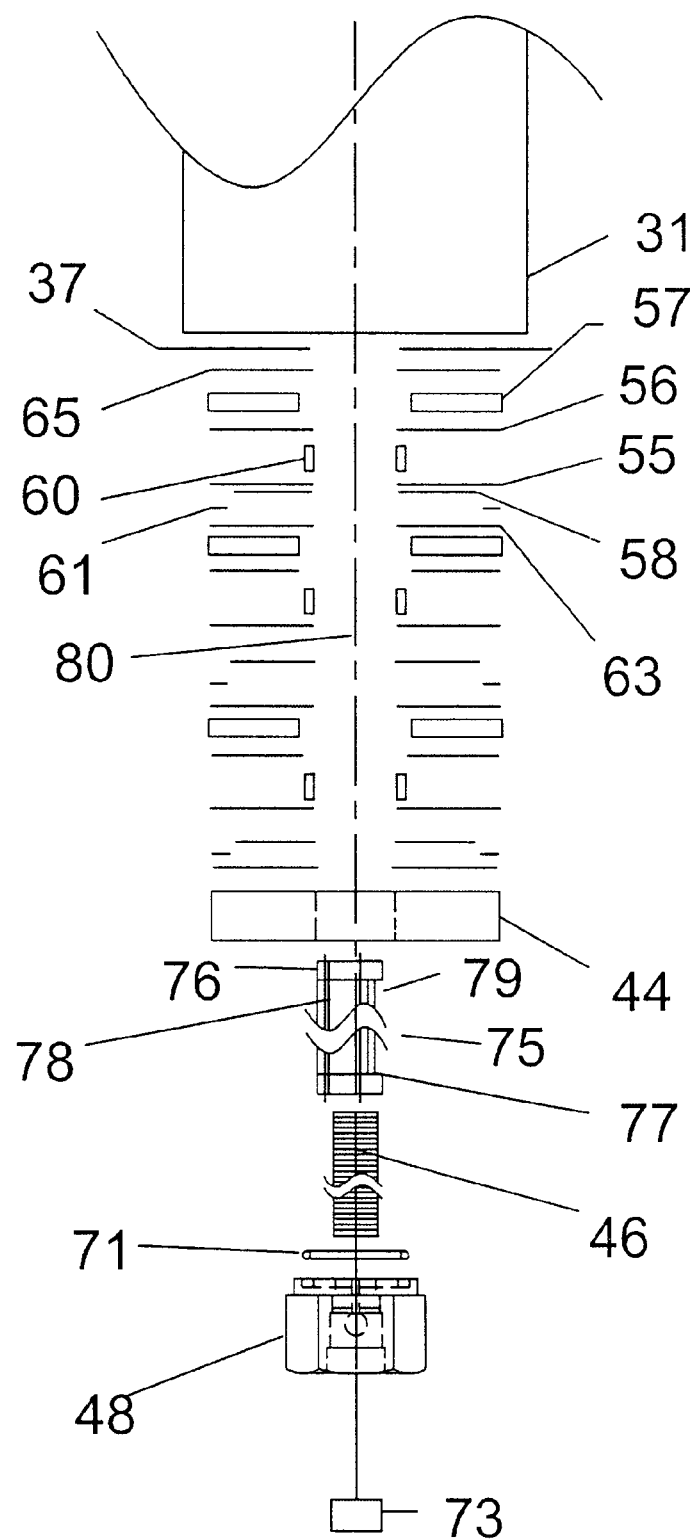
FIG. 5 is an exploded view of the lower end of the fuel cell of FIG. 2 showing the components of the diffusion cell units.

If desired, a center manifold 75 may be mounted within the fuel flow channel 35 around the bolt 46 to distribute fuel and to help distribute moisture evenly through the length of the flow channel 35. The center manifold may be formed as described in patents U.S. Pat. Nos. 5,514,486 and 5,595,834, or in other manners as desired. As shown in FIGS. 3–5, the center manifold includes end rings 76 and 77 between which are mounted rods 78 that hold the end rings 76 and 77 in spaced relation to define a framework, with hydrophilic threads or "yarn" 79 attached to and extending axially between the end rings 76 and 77 to help wick liquid water axially through the fuel flow channel and thereby distribute moisture more evenly to the fuel cell elements 31.

The exploded view of FIG. 5 illustrates the manner in which the various components of the diffusion cell units 39 are assembled in stacked relation along a common central axis 80. As noted, the active fuel cell units 31 may have the same construction as the diffusion cell units and may be assembled in a similar manner along the central axis 80.

To illustrate the effect of the utilization of the diffusion cell units in accordance with the present invention, a conventional fuel cell of the type shown at 10 in FIG. 1 with 20 fuel cell units was operated to supply power to a load at 0.07 A/cm$^2$, and the voltage across the bottom three fuel cell units in the stack (the fuel cell units closest to the closed end of the fuel flow channel) were individually monitored. As shown in Table 1, the voltages across these cells at the start of the test ranged between 0.831 and 0.877 volts, but the output voltage across these cells deteriorated very rapidly so that in less than one-half hour the voltage measured across the three cells was essentially zero (and for some cell units even somewhat negative because of the voltage drop across the cells due to the current flowing through all of the cell units). Thus, the last three fuel cell units in the stack made essentially no contribution to the output voltage of the stack and, in fact, may impose an additional load on the working fuel cell units in the stack.

TABLE 1

| Example 1 No diffusion cells | Time of test | Volts |
|---|---|---|
| n (End) operating cell (#20) | 0 hours | 0.875 |
| n – 1 operating cell (#19) | | 0.877 |
| n – 2 operating cell (#18) | | 0.831 |
| 20 cell stack | | 11.08 |
| Voltage per cell | | 0.554 |
| n (End) operating cell (#20) | 0.11 hours | 0.189 |
| n – 1 operating cell (#19) | | 0.130 |
| n – 2 operating cell (#18) | | 0.574 |
| 20 cell stack | | 11.26 |
| Voltage per cell | | 0.563 |
| n (End) operating cell (#20) | 0.26 hours | −0.019 |
| n – 1 operating cell (#19) | | −0.005 |
| n – 2 operating cell (#18) | | 0.022 |
| 20 cell stack | | 11.18 |
| Voltage per cell | | 0.556 | n = 20

In accordance with the present invention, a fuel cell 30 as in FIGS. 2–5 was constructed with 17 active fuel cell units 31 between the current collectors 36 and 37, and with three diffusion cell units 39 below the bottom current collector 37. Otherwise, the construction of the fuel cell units was identical to the fuel cell units for the conventional fuel cell that yielded the test results shown in Table 1. The lowest three operating fuel cell units in the fuel cell (the three fuel cell units closest to the lower current collector 37) were individually monitored to determine the voltage across each cell. The fuel cell was then operated at 0.07 A/cm$^2$ immediately after the tests shown in Table 1, and the voltages across the three lowermost active fuel cell units was recorded over a period of ten hours. The results of the test with the fuel cell in accordance with the invention are shown in Table 2. As illustrated therein, at the start of the test the voltages across the lowermost operating fuel cell units was relatively low, but the voltages steadily increased during operation, and after approximately one hour all of the monitored fuel cell units were operating near or above 0.6 volts. As illustrated by the data in Table 2, even after nine and one-half hours of operation, each of the lowermost fuel cell units was performing satisfactorily, demonstrating that the diffusion cell units of the invention had effectively eliminated the deterioration of the fuel cell operation seen in conventional fuel cells. As is apparent from a comparison of the data in Tables 1 and 2, even though the fuel cell in accordance with the invention had three fewer active fuel cell units, the overall output voltage obtained from the 17 operating fuel cell units is nearly the same as that obtained from the 20 fuel cell units of the conventional fuel cell, in which the bottom-most fuel cell units either contributed essentially no output power or constituted an actual additional load imposed on the working fuel cell units.

TABLE 2

| Example 2 with three diffusion cells | Time of test | Volts |
|---|---|---|
| End operating cell #17 | 0 hours | 0.017 |
| n – 1 operating cell #16 | | 0.14 |
| n – 2 operating cell #15 | | 0.583 |
| 17 cell stack | | 9.78 |
| Voltage per cell | | 0.575 |
| End operating cell #17 | 0.13 hours | 0.399 |
| n – 1 operating cell #16 | | 0.499 |
| n – 2 operating cell #15 | | 0.623 |
| 17 cell stack | | 10.28 |
| Voltage per cell | | 0.605 |
| End operating cell #17 | 0.53 hours | 0.579 |
| n – 1 operating cell #16 | | 0.583 |
| n – 2 operating cell #15 | | 0.634 |
| 17 cell stack | | 10.94 |
| Voltage per cell | | 0.644 |
| End operating cell #17 | 2.31 hours | 0.843 |
| n – 1 operating cell #16 | | 0.607 |
| n – 2 operating cell #15 | | 0.635 |
| 17 cell stack | | 10.50 |
| Voltage per cell | | 0.618 |
| End operating cell #17 | 5.88 hours | 0.841 |
| n – 1 operating cell #16 | | 0.616 |
| n – 2 operating cell #15 | | 0.635 |
| 17 cell stack | | 10.50 |
| Voltage per cell | | 0.618 |
| End operating cell #17 | 9.38 hours | 0.837 |
| n – 1 operating cell #16 | | 0.616 |
| n – 2 operating cell #15 | | 0.634 |
| 17 cell stack | | 10.46 |
| Voltage per cell | | 0.615 | n = 17

Table 3 below shows a comparison of the fuel cell power output with and without the use of diffusion cell units in accordance with the invention.

TABLE 3

| Power Output for a Current of 1 ampere Without and With Diffusion Cells | | |
|---|---|---|
| | 20 cells with no diffusion cells | 20 cells with 3 diffusion cells |
| Average cell voltage, volts | 0.556 | 0.615 |
| 20 cell voltage, volts | 11.12 | 12.30 |

TABLE 3-continued

Power Output for a Current of 1 ampere
Without and With Diffusion Cells

|  | 20 cells with no diffusion cells | 20 cells with 3 diffusion cells |
|---|---|---|
| Power, watts | 11.12 | 12.30 |
| Fuel cell efficiency, % | 44.5 | 49.2 |

Fuel Cell Efficiency Calculated According to *Fuel Cell Systems Explained,* Larminie and Dicks, John Wiley & Sons, Ltd., 2000, p. 27–29.

The data in the foregoing tables clearly show the effect of running a fuel cell with a closed end. Non-active gasses, such as water vapor, accumulate at the end of the stack opposite of the hydrogen inlet and cause a decline of cell voltage due to dilution of the hydrogen. This voltage decline causes the voltage of the stack to be lowered.

The data in Table 1 is based on a 20 cell stack while that in Table 2 is based on a 17 cell stack. The three end cells in the 17 cell stack are the diffusion cells, since they are no longer operating. Table 3 normalizes the Table 2 data to a 20 cell stack so that the two stacks are comparable. This is done by using the average cell voltage and multiplying by 20. It is clear that since the operating voltage per cell is higher with the diffusion cells, the voltage of a 20 cell stack will be higher.

Table 3 also illustrates fuel cell efficiency. The efficiency measure compares the energy actually obtained from the fuel cell to the maximum theoretically obtained by burning the hydrogen in oxygen. The efficiency of a fuel cell is easily calculated from the cell voltage. A cell voltage of 1.25 volts represents 100% efficiency. As can be seen, the stack operating with the diffusion cells has a higher cell voltage and is therefore operating at a higher efficiency. This is very desirable for generation of the maximum amount of energy from a limited amount of resources.

In addition to the above considerations, there are other reasons to avoid operation of fuel cell units near or below zero voltage. There are certain deleterious effects to such operation, an explanation of which follows.

The normal chemical reactions in the fuel cell convert hydrogen and oxygen to water:

$$O_2 + 2H_2 \rightarrow 2H_2O \tag{1}$$

The anode reaction is the dissociation of atomic hydrogen to produce hydrogen ions and electrons:

$$H_2 \rightarrow 2H^+ + 2e^- \tag{2}$$

The cathode reaction is the oxidation of the hydrogen ions with the absorption of electrons:

$$4H^+ + O_2 + 4e^- \rightarrow 2H_2O \tag{3}$$

The combination of these two electrode reactions creates a flow of electrons, which is electrical current.

If the voltage of a cell drops to a very low level in an operating fuel cell, these reactions will cease and be replaced by other, undesirable, reactions. As long as current is flowing through the proton exchange membrane some electrochemical reactions must take place since it cannot conduct electrons. Among these reactions will be the reverse of reaction (1), which is the electrolysis of water to hydrogen and oxygen:

$$2H_2O \rightarrow O_2 + 2H_2 \tag{4}$$

The oxygen which is produced by reaction (4) is highly concentrated and very reactive so it will oxidize some of the materials in its vicinity. Thus, the proton exchange membrane and gas diffusion backings will be oxidized by the oxygen and degraded. This will lead to a loss of proton conductivity by the membrane and a loss of electronic conductivity by the backing. The performance capability of the fuel cell will therefore be degraded and eventually destroyed by the operation of some of the cells at low, and or, negative voltages.

Figure 6:
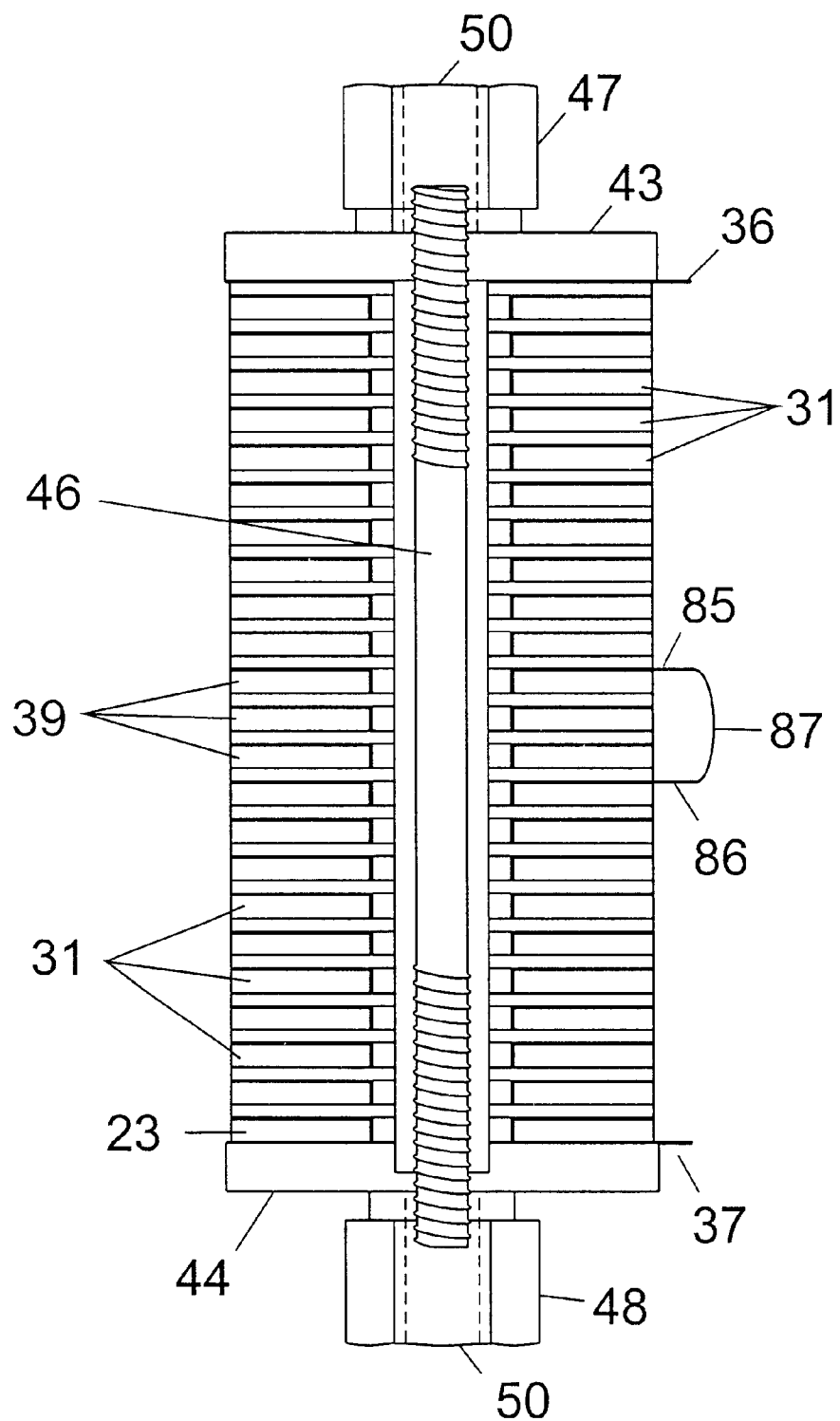
FIG. 6 is a simplified cross-sectional view of a further passive air breathing fuel cell in accordance with the invention.

As indicated above, where hydrogen gas is fed in from both ends of the fuel cell stack, flooding will tend to occur at the cells in the middle of the stack rather than at the cells at one end. The present invention may also be utilized with such double ended feeding. As illustrated in FIG. 6, a fuel cell in accordance with the present invention may have hydrogen gas fed in through the inlet openings in both the nuts 47 and 48. In this case, the diffusion cells 39 are mounted in the middle of the stack and are separated from the active cell units 31 in the stack by electrically conductive plates 85, at one end of the stack of diffusion cells 39, and 86 at the other end of the stack of cells 39. An electrically conductive jumper or bridge 87 is connected between the plates 85 and 86 to conduct current across the plates so that current flow from the active cells will be transmitted to the terminals 36 and 37. The diffusion cells 39 thus do not have current flowing through them. The fuel cell of FIG. 6 may be otherwise constructed in the same manner as the fuel cell 30 as discussed above.

It is understood that the invention is not confined to the particular embodiments set forth herein as illustrative, but embraces all such forms thereof as come within the scope of the following claims.

What is claimed is:

1. A polymer electrolyte fuel cell comprising:
   (a) a plurality of fuel cell units defining an outer periphery and arranged along a common central axis in a stack, the fuel cell units including a polymer electrolyte membrane, wherein the stacked fuel cell units have an inner periphery defining a fuel flow channel through which fuel can flow in an axial direction;
   (b) an electrically conductive current collector electrically connected to a fuel cell unit at one end of the stack of fuel cell units and an electrically conductive current collector electrically connected to a fuel cell unit at another end of the stack of fuel cell units;
   (c) a fuel supply inlet at one end of the stack to direct fuel therethrough to the fuel flow channel; and
   (d) at least one diffusion cell unit mounted at the end of the stack of fuel cell units opposite to that at which the fuel inlet is located and at a position below the current collector at that end of the stack, the diffusion cell unit comprising at least a layer of diffuser material, the diffusion cell unit having an outer periphery and an inner periphery that defines a continuation of the fuel flow channel, the diffuser material formed to diffuse water vapor from the fuel flow channel outwardly therethrough from the inner periphery to the outer periphery of the diffusion cell unit, the fuel flow channel being closed at an end thereof adjacent to the diffusion cell unit.

2. The fuel cell of claim 1 wherein there are a plurality of diffusion cell units mounted together in stacked relation.

3. The fuel cell of claim 2 including a metal cell divider between adjacent diffusion cell units in the stack of diffusion cell units.

4. The fuel cell of claim 2 wherein there are at least three diffusion cell units mounted together in stacked relation.

5. The fuel cell of claim 1 wherein the diffusion cell unit includes a moisture permeable film layer between top and bottom layers of diffuser material, a gasket mounted at the outer periphery to prevent air flow from outside the fuel cell to one of the top or bottom diffuser layers and a gasket mounted at the inner periphery of the diffusion cell unit to prevent fuel flow from the flow channel to the other of the top and bottom diffuser layers.

6. The fuel cell of claim 5 wherein the moisture permeable film layer comprises a polymer electrolyte membrane, and further including a cathode at one side of the polymer electrolyte membrane and an anode at the other side of the polymer electrolyte membrane, one of the top or bottom diffuser layers in contact with one of the anode or cathode and the other of the top and bottom diffuser layers in contact with the other of the anode or cathode.

7. The fuel cell of claim 5 wherein the moisture permeable film layer is a nylon film.

8. The fuel cell of claim 1 wherein the fuel cell units and the diffusion cell units are annular in shape, having a circular outer periphery and a circular inner periphery defining walls of the fuel flow channel.

9. The fuel cell of claim 8 including a fuel distribution manifold mounted in the flow channel.

10. The fuel cell of claim 9 wherein the fuel distribution manifold comprises a framework with end rings mounted at opposite ends of the framework and hydrophilic threads extending between the end rings in the axial direction within the flow channel.

11. The fuel cell of claim 1 including an end plate mounted at the one end of the stack of fuel cell units at which the fuel supply inlet is located and an end plate mounted at the at least one diffusion cell unit to clamp the fuel cell units and diffusion cell unit together.

12. The fuel cell unit of claim 11 including a bolt extended through the flow channel and connected to the end plates to draw the end plates toward each other to clamp the fuel cell units and diffusion cell unit together.

13. The fuel cell of claim 1 wherein the fuel cell units each include a polymer electrolyte membrane between top and bottom layers of diffuser material, a gasket mounted at the outer periphery of the fuel cell unit to prevent air flow from outside the fuel cell to one of the top or bottom diffuser layers and a gasket mounted at the inner periphery of the fuel cell unit to prevent fuel flow from the flow channel to the other of the top and bottom diffuser layers, a cathode at one side of the polymer electrolyte membrane and an anode at the other side of the polymer electrolyte membrane, one of the top or bottom diffuser layers in contact with one of the anode or cathode and the other of the top and bottom diffuser layers in contact with the other of the anode or cathode.

14. A polymer electrolyte fuel cell comprising:
(a) a plurality of fuel cell units defining an outer periphery and arranged along a common central axis in a stack, the fuel cell units including a polymer electrolyte membrane, wherein the stacked fuel cell units are annular in shape with an inner periphery defining a fuel flow channel through which fuel can flow in an axial direction;
(b) an electrically conductive current collector electrically connected to a fuel cell unit at one end of the stack of fuel cell units and an electrically conductive current collector electrically connected to a fuel cell unit at another end of the stack of fuel cell units;
(c) a fuel supply inlet at one end of the stack to direct fuel therethrough to the fuel flow channel; and
(d) a plurality of diffusion cell units mounted together in a stack at the end of the stack of fuel cell units opposite to that at which the fuel inlet is located and at a position below the current collector at that end of the stack of fuel cell units, each diffusion cell unit having an outer periphery and an inner periphery that defines a continuation of the fuel flow channel and a moisture permeable film layer between top and bottom layers of diffuser material, a gasket mounted at the outer periphery of the diffusion cell unit to prevent air flow from outside the fuel cell to one of the top or bottom diffuser layers and a gasket mounted at the inner periphery of the diffusion cell unit to prevent fuel flow from the flow channel to the other of the top and bottom diffuser layers, the fuel flow channel being closed at an end thereof adjacent to the diffusion cell units.

15. The fuel cell of claim 14 including a metal cell divider between adjacent diffusion cell units in the stack of diffusion cell units.

16. The fuel cell of claim 14 wherein there are at least three diffusion cell units mounted together in stacked relation.

17. The fuel cell of claim 14 wherein the moisture permeable film layer of each diffusion cell unit comprises a polymer electrolyte membrane, and further including a cathode at one side of the polymer electrolyte membrane and an anode at the other side of the polymer electrolyte membrane, one of the top or bottom diffuser layers in contact with one of the anode or cathode and the other of the top or bottom diffuser layers in contact with the other of the anode or cathode.

18. The fuel cell of claim 14 wherein the moisture permeable film layer is a nylon film.

19. The fuel cell of claim 14 wherein the fuel cell units and the diffusion cell units are annular in shape, each having a circular outer periphery and a circular inner periphery defining walls of the flow channel.

20. The fuel cell of claim 19 including a fuel distribution manifold mounted in the flow channel.

21. The fuel cell of claim 20 wherein the fuel distribution manifold comprises a framework with end rings mounted at opposite ends of the framework and hydrophilic threads extending between the end rings in the axial direction within the flow channel.

22. The fuel cell of claim 14 including an end plate mounted at the one end of the stack of fuel cell units at which the fuel supply inlet is located and an end plate mounted at the diffusion cell units to clamp the fuel cell units and diffusion cell units together.

23. The fuel cell unit of claim 22 including a bolt extended through the flow channel and connected to the end plates to draw the end plates toward each other to clamp the fuel cell units and diffusion cell units together.

24. The fuel cell of claim 14 wherein the fuel cell units each include a polymer electrolyte membrane between top and bottom layers of diffuser material, a gasket mounted at the outer periphery of each fuel cell unit to prevent air flow from outside the fuel cell to one of the top or bottom diffuser layers and a gasket mounted at the inner periphery of the fuel cell unit to prevent fuel flow from the flow channel to the other of the top or bottom diffuser layers, a cathode at one side of the polymer electrolyte membrane and an anode at the other side of the polymer electrolyte membrane, one of the top or bottom diffuser layers in contact with one of the anode or cathode and the other of the top or bottom diffuser layers in contact with the other of the anode or cathode.

25. A polymer electrolyte fuel cell comprising:
(a) a plurality of fuel cell units defining an outer periphery and arranged along a common central axis in a stack, the fuel cell units including a polymer electrolyte membrane, wherein the stacked fuel cell units have an inner periphery defining a fuel flow channel through which fuel can flow in an axial direction;

(b) an electrically conductive current collector electrically connected to a fuel cell unit at one end of the stack of fuel cell units and an electrically conductive current collector electrically connected to a fuel cell unit at another end of the stack of fuel cell units;

(c) a fuel supply inlet at each end of the stack to direct fuel therethrough to the fuel flow channel; and (d) at least one diffusion cell unit mounted in the middle of the stack of fuel cell units, the diffusion cell unit comprising at least a layer of diffuser material, the diffusion cell unit having an outer periphery and an inner periphery that defines a continuation of the fuel flow channel, the diffuser material formed to diffuse water vapor from the fuel flow channel outwardly therethrough from the inner periphery to the outer periphery of the diffusion cell unit, and an electrically conductive bridge conducting current around the at least one diffusion cell unit between the fuel cell units below the diffusion cell unit and the fuel cell unit above the diffusion cell unit.

26. The fuel cell of claim 25 wherein there are a plurality of diffusion cell units mounted together in stacked relation.

27. The fuel cell of claim 26 including a metal cell divider between adjacent diffusion cell units in the stack of diffusion cell units.

28. The fuel cell of claim 26 wherein there are at least three diffusion cell units mounted together in stacked relation.

29. The fuel cell of claim 25 wherein the diffusion cell unit includes a moisture permeable film layer between top and bottom layers of diffuser material, a gasket mounted at the outer periphery to prevent air flow from outside the fuel cell to one of the top or bottom diffuser layers and a gasket mounted at the inner periphery of the diffusion cell unit to prevent fuel flow from the flow channel to the other of the top and bottom diffuser layers.

30. The fuel cell of claim 29 wherein the moisture permeable film layer comprises a polymer electrolyte membrane, and further including a cathode at one side of the polymer electrolyte membrane and an anode at the other side of the polymer electrolyte membrane, one of the top or bottom diffuser layers in contact with one of the anode or cathode and the other of the top and bottom diffuser layers in contact with the other of the anode or cathode.

31. The fuel cell of claim 29 wherein the moisture permeable film layer is a nylon film.

32. The fuel cell of claim 25 wherein the fuel cell units and the diffusion cell units are annular in shape, having a circular outer periphery and a circular inner periphery defining walls of the fuel flow channel.

33. The fuel cell of claim 32 including a fuel distribution manifold mounted in the flow channel.

34. The fuel cell of claim 33 wherein the fuel distribution manifold comprises a framework with end rings mounted at opposite ends of the framework and hydrophilic threads extending between the end rings in the axial direction within the flow channel.

35. The fuel cell of claim 25 including an end plates mounted at the ends of the stack of fuel cell units to clamp the fuel cell units and diffusion cell unit together.

36. The fuel cell unit of claim 35 including a bolt extended through the flow channel and connected to the end plates to draw the end plates toward each other to clamp the fuel cell units and diffusion cell unit together.

37. The fuel cell of claim 35 wherein the fuel cell units each include a polymer electrolyte membrane between top and bottom layers of diffuser material, a gasket mounted at the outer periphery of the fuel cell unit to prevent air flow from outside the fuel cell to one of the top or bottom diffuser layers and a gasket mounted at the inner periphery of the fuel cell unit to prevent fuel flow from the flow channel to the other of the top and bottom diffuser layers, a cathode at one side of the polymer electrolyte membrane and an anode at the other side of the polymer electrolyte membrane, one of the top or bottom diffuser layers in contact with one of the anode or cathode and the other of the top and bottom diffuser layers in contact with the other of the anode or cathode.

* * * * *